United States Patent [19]
Ishioka et al.

[11] Patent Number: 5,409,078
[45] Date of Patent: Apr. 25, 1995

[54] ADAPTIVELY CONTROLLED VIBRATION DAMPING SUPPORT APPARATUS FOR VEHICLE POWER UNIT INCLUDING ENGINE

[75] Inventors: Yutaka Ishioka, Nagoya; Yoshikazu Kato, Kasugai; Katsuhiro Goto, Komaki, all of Japan

[73] Assignee: Tokai Rubber Industries, Ltd., Japan

[21] Appl. No.: 122,166

[22] Filed: Sep. 17, 1993

[30] Foreign Application Priority Data

Sep. 21, 1992 [JP] Japan .................................. 4-276593

[51] Int. Cl.⁶ .............................................. B60K 1/00
[52] U.S. Cl. ..................................... 180/300; 188/378
[58] Field of Search ............... 180/300, 312, 902, 299, 180/310; 188/378; 267/136

[56] References Cited

U.S. PATENT DOCUMENTS

| | | |
|---|---|---|
| 4,083,433 | 4/1979 | Geohegan, Jr. et al. ....... 188/378 X |
| 4,664,219 | 5/1987 | Hoerig et al. .................... 180/902 X |
| 4,699,348 | 10/1987 | Freudenberg .................. 180/300 X |
| 4,869,474 | 9/1989 | Best et al. ............................ 267/136 |

FOREIGN PATENT DOCUMENTS

| | | |
|---|---|---|
| 0220924 | 10/1986 | Japan .................................. 180/300 |
| 3-219139 | 9/1991 | Japan . |
| 4113927 | 4/1992 | Japan .................................. 180/300 |

*Primary Examiner*—Margaret A. Focarino
*Assistant Examiner*—Christopher E. Ellis
*Attorney, Agent, or Firm*—Parkhurst, Wendel & Rossi

[57] ABSTRACT

A vibration damping support apparatus for a power unit of an automobile is disclosed which includes: an oscillating device disposed between a vehicle body and the power unit, for oscillating the power unit with respect to the vehicle body; a first sensor attached to the power unit, for detecting vibration of the power unit; a second sensor attached to a member of a vehicle suspension system, for detecting vibration of the suspension member which is displaced relative to the vehicle body in response to movements of vehicle wheels; a third sensor attached to a monitoring point on the vehicle body, for detecting vibration of the vehicle body at the monitoring point; and a control device for controlling the oscillating device, based on a first reference signal and a second reference signal received from the first and second sensors, respectively, and an error signal received from the third sensor, the control device performing an adaptive control so that the error signal is minimized.

6 Claims, 2 Drawing Sheets

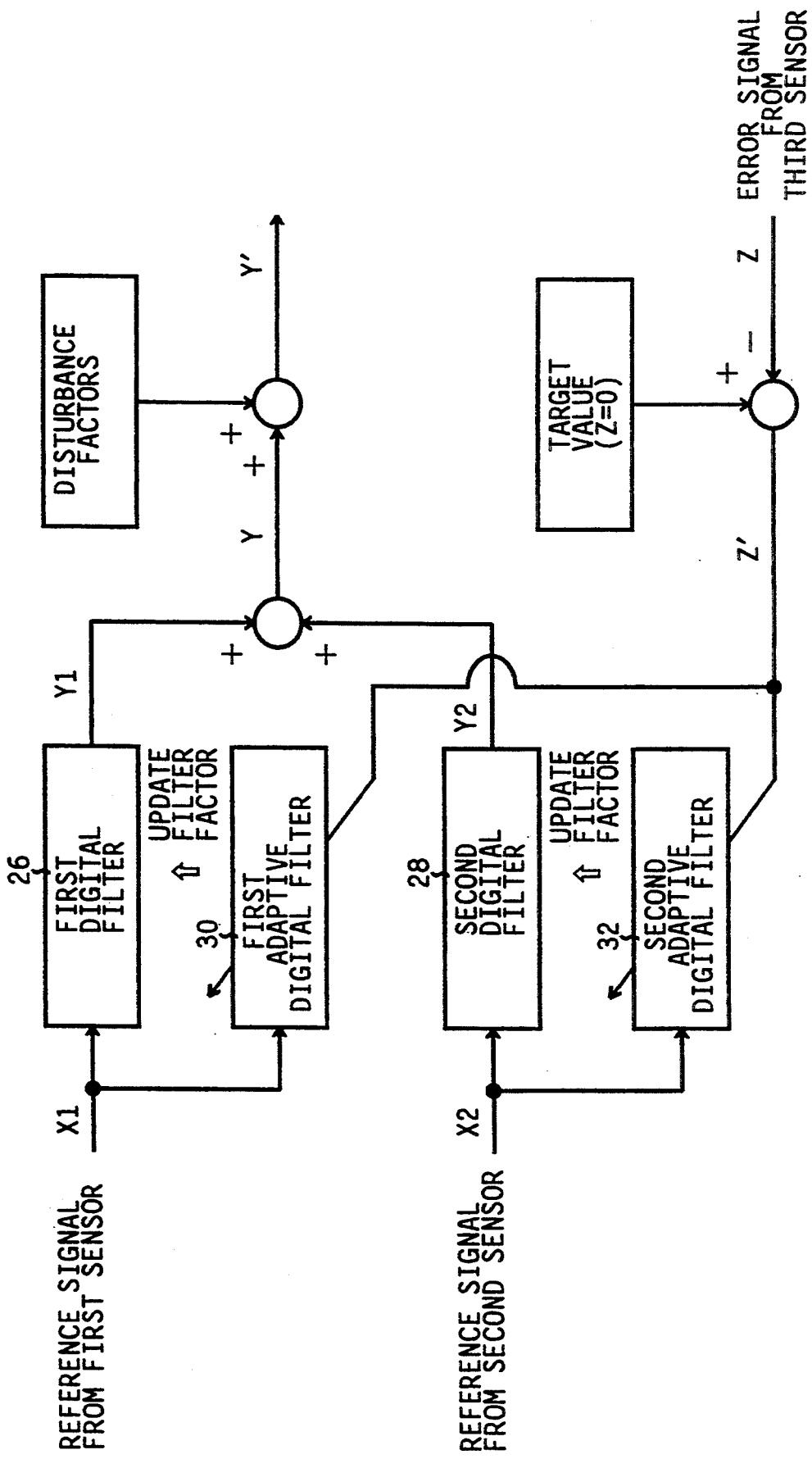

ADAPTIVELY CONTROLLED VIBRATION DAMPING SUPPORT APPARATUS FOR VEHICLE POWER UNIT INCLUDING ENGINE

BACKGROUND OF THE INVENTION

1. Field of the Invention

The present invention relates in general to a vibration damping support apparatus for supporting a power unit of an automobile, and more particularly to such a support apparatus which positively controls vibrations that are transmitted from the power unit to the body of the automobile, to thereby provide excellent vibration damping and isolating effects with respect to input vibrations over a relatively wide frequency range, that is, from low-frequency vibrations such as shakes to high-frequency vibrations such as booming noise.

2. Discussion of the Related Art

To damp or isolate vibrations and noises in the interior of an automobile, a power unit including an engine is flexibly supported on the vehicle body by a plurality of engine mounts, so as to reduce transmission of vibrations from the power unit to the vehicle body. When the power unit is flexibly or elastically supported by conventional passive-type elastic mounts having predetermined spring or damping characteristics, however, vibrations are undesirably amplified around a resonance point of a suspension system that consists of the power unit and its support device (i.e., the elastic mounts). Thus, the conventional arrangement as described above may adversely increase the vibrations transmitted to the vehicle body.

As one type of engine mounts, there is also proposed a fluid-filled elastic mount whose spring or damping characteristics are variable. However, the above problem due to the resonance cannot be solved by use of such an elastic mount. Namely, since the vibrations transmitted from the power unit usually include vibratory components in a relatively wide frequency range, it is extremely difficult for the above type of the elastic mount to effectively damp or isolate the whole frequency range of the input vibrations.

In recent years, a vibration control device for positively reducing vibration of a subject has been developed, which device includes oscillating means for generating an oscillating force for eliminating or cancelling the vibration of the subject. An example of such device is disclosed in JP-A-3-219139, which includes an actuator interposed between the power unit and the vehicle body. The actuator is adaptively controlled based on a signal received from a vibration sensor attached to the power unit, and a signal received from a vibration sensor attached to the vehicle body, so as to generate the counter oscillating force which reduces the vibrations transmitted from the power unit to the vehicle body.

However, such a vibration control device as described above is not satisfactory in its ability to reduce the vibrations that are transmitted from the power unit to the vehicle body. Thus, it has been difficult for the known vibration control device to provide sufficiently high vibration damping and isolating effects.

In the adaptive control of the oscillating means by the positive-type vibration control device as described above, control signals for controlling the oscillating means are calculated based on the following information: (a) an error signal representative of the magnitude of vibrations to be controlled, which take place at a given monitoring point on the vehicle body; and (b) a reference signal based on which the adaptive control of the oscillating means is effected according to an algorithm. The selection of these two kinds of signals and the design and positioning of the oscillating means are important factors for achieving desirable adaptive control of the oscillating means. In particular, it is extremely important to assure that the obtained reference signal indicated above at (b) represents such information that has a close relationship with the characteristics of the vibrations to be reduced at the monitoring point of the vehicle body. The monitoring point is selected in an area where the vibration damping is desired.

In this connection, the vibrations of the power unit which cause the vehicle body to vibrate include (1) high-frequency vibrations, such as booming noise, due to explosion process of the engine and rotation of its crankshaft, and (2) low-frequency vibrations, such as shakes, due to the resonance of the power unit suspension system resulting from an oscillating force applied from the vehicle wheels while the automobile is running on a bumpy road surface. The high-frequency vibrations indicated above can be effectively isolated by an adaptive control using the signal from the vibration sensor attached to the power unit, since the high-frequency vibrations detected at virtially all points on the vehicle body are highly closely related to the vibrations of the power unit. On the other hand, when the low-frequency vibrations such as shakes arise from the resonance of the power unit suspension system, an adaptive control of the oscillating means on the basis of the vibration of the power unit will usually result in reduction in the oscillation of the power unit per se. To favorably control the low-frequency vibrations, however, it is undesirable to use the vibrations of the power unit as a control signal in a control circuit for the oscillating means, from the standpoints of the construction and control accuracy of the control circuit. Thus, using the vibrations of the power unit as the control signal makes it difficult to achieve sufficiently high vibration damping and isolating effects with respect to the low-frequency vibrations.

SUMMARY OF THE INVENTION

It is therefore an object of the present invention to provide a positively controlled vibration damping support apparatus for a power unit of an automobile, which exhibits an excellent vibration damping effect even with respect to low-frequency vibrations such as shakes.

The above object may be accomplished according to the principle of the present invention, which provides a vibration damping support apparatus for a power unit of an automobile, the power unit including an engine and being flexibly supported on a vehicle body of the automobile via a plurality of elastic mounts, comprising: (a) oscillating means disposed between the vehicle body and the power unit, for oscillating the power unit with respect to the vehicle body; (b) a first sensor attached to the power unit, for detecting vibration of the power unit; (c) a second sensor attached to a suspension member of a suspension system of the automobile, for detecting vibration of the suspension member, the suspension member being displaced relative to the vehicle body in accordance with movement of wheels of the automobile; (d) a third sensor attached to a monitoring point on the vehicle body, for detecting vibration of the vehicle body at the monitoring point; and (e) control means for controlling the oscillating means, based on a first reference signal and a second reference signal received from the first sensor and the second sensor, respectively, and an error signal received from the third sensor, the control means performing an adaptive control for controlling an operation of the oscillating means, so that the error signal is minimized.

The vibration of the suspension member detected by the second sensor is based on an oscillating force transmitted from the wheels running over a bumpy road surface, and is thus highly closely related to shakes and other vibrations caused by the resonance of the power unit suspension system (including the elastic mounts) due to the above oscillating force.

In the vibration damping support apparatus as described above, therefore, the first sensor is able to generate a signal that accurately reflects high-frequency vibrations of the power unit which cause booming noise and the like, while the second sensor is able to generate a signal that accurately reflects low-frequency vibrations of the power unit which cause shakes and the like. The control means uses these signals generated by the first and second sensors as the first and second reference signals, and adaptively controls the oscillating means so that the vibration of the vehicle body as detected by the third sensor is reduced to a minimum. Consequently, the present support apparatus exhibits excellent vibration damping and isolating effects with respect to input vibrations over a relatively wide frequency range, that is, from low-frequency vibrations such as shakes to high-frequency vibrations such as booming noise.

BRIEF DESCRIPTION OF THE DRAWINGS

The above and optional objects, features and advantages of the present invention will be better understood by reading the following detailed description of a presently preferred embodiment of the invention, when considered in conjunction with the accompanying drawings, in which:

FIG. 2 is a block diagram showing one example of a control device of the support apparatus of FIG. 1.

DETAILED DESCRIPTION OF THE PREFERRED EMBODIMENT

Figure 1:
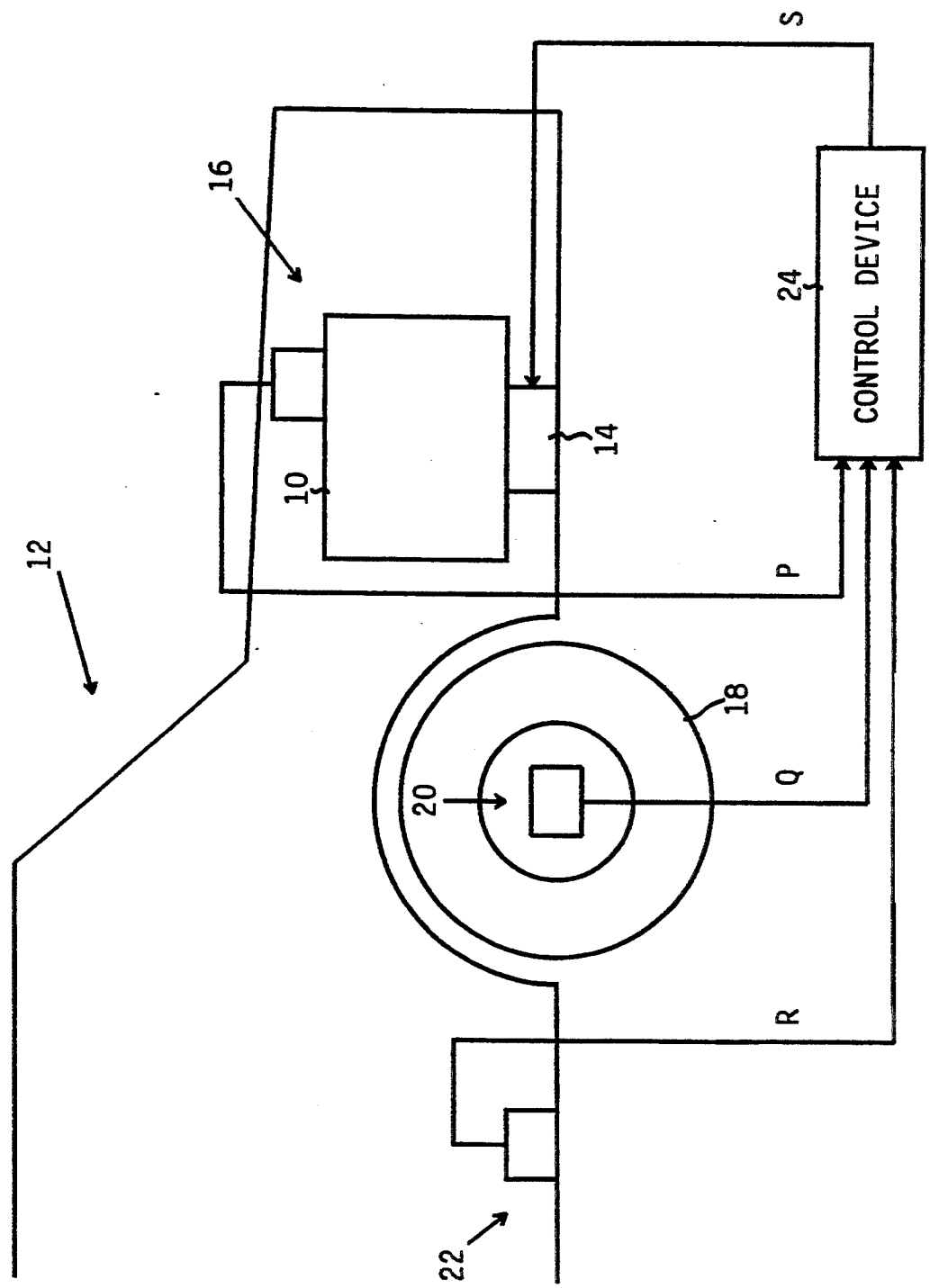
FIG. 1 is an explanatory view schematically showing one embodiment of a vibration damping support apparatus of the present invention.

Referring first to FIG. 1 schematically showing one embodiment of the present invention in the form of a vibration damping support apparatus, reference numeral 10 denotes a power unit of an automobile, which includes an engine and which is flexibly mounted on a vehicle body 12 in a vibration damping or isolating manner, by means of a plurality of elastic mounts.

An oscillating device 14 is installed between the power unit 10 and the vehicle body 12. This oscillating device 14 is adapted to oscillate the power unit 10 with controllable amplitude and frequency. More specifically, a known electromagnetic or piezoelectric actuator, ultrasonic motor, or pneumatically or hydraulically operated system may be used as the oscillating device 14. The power unit 10 may be flexibly mounted on the vehicle body 12 through a mounting device as proposed in JP-A-2-42228, which incorporates such oscillating means as the device 14.

To the power unit 10, there is attached a first vibration sensor 16 for detecting vibration of the power unit 10. This first vibration sensor 16 is adapted to detect the oscillatory waveform (amplitude and frequency) of the power unit 10, and may be selected from known devices such as acceleration sensors, displacement sensors, speed sensors, load sensors and microphones.

On the other hand, a second vibration sensor 20 is attached to a member of a suspension system for connecting vehicle wheels 18 to the vehicle body 12. The suspension member provided with the second vibration sensor 20 is a member which is displaced in response to a movement of the wheels 18 relative to the vehicle body 12, and may be selected from various types of suspension rods, links and arms, shock absorbers, springs, and the like. The above-indicated known devices such as acceleration sensors used as the first sensor 16 may be used as the second sensor 20.

A third vibration sensor 22 is provided at an appropriate monitoring point on the vehicle body 12. The monitoring point is selected as a position of the vehicle body 12 at which vibrations should be damped or isolated. For example, the monitoring point is located under the driver's seat. The above-indicated known devices such as acceleration sensors used as the first and second vibration sensors 16, 20 may be used as the third vibration sensor 22.

The present support apparatus further includes a control device 24 which receives respective signals "P", "Q", "R" from the first, second and third vibration sensors 16, 20, 22. This control device 24 is adapted to process the signals "P" and "Q" from the first and second sensors 16, 20 as a first reference signal and a second reference signal, respectively, and process the signal "R" from the third sensor 22 as an error signal, so as to produce a control signal "S" for controlling the oscillating device 14, to thereby minimize the vibrations represented by the error signal "R" at the monitoring point of the vehicle body 12.

The control device 24 performs an adaptive control in which vibration transfer between the power unit 10 and the vehicle body 12 is controlled depending upon running conditions of the automobile, vibration transmitting properties of the vehicle body, operating characteristics of sensing elements and amplifiers of the control device 24 and those of the oscillating device 14. An example of the control device 24 is illustrated in FIG. 2, which includes a first and a second digital filter 26, 28 and a first and a second adaptive digital filter 30, 32.

The first digital filter 26 converts an input signal "$X_1$" ("P") from the first vibration sensor 16 into an output signal "$Y_1$" that is used for controlling the oscillating device 14. The second digital filter 28 converts an input signal "$X_2$" ("Q") from the second vibration sensor 20 into an output signal "$Y_2$" that is also used for controlling the oscillating device 14. The first and second adaptive digital filters 30 and 32 serve to update the filter factors of the first and second digital filters 26, 28, respectively, at a predetermined frequency.

According to a suitable adaptive control algorithm, the first and second adaptive digital filters 30, 32 control the respective filter factors of the first and second digital filters 26, 28 so as to converge at a high speed, and change at a high speed these filter factors as the vibration transfer characteristics of the vibration control system are varied depending upon the running conditions of the automobile, so as to minimize the vibrations of the vehicle body 12 as detected by the third vibration sensor 22, that is, to zero an input signal "Z" from the third sensor 22 as indicated in FIG. 2. Thus, the first and second adaptive digital filters 30, 32 sequentially update the respective filter factors of the first and second digital filters 26, 28, following instantaneous variations of the vibration transfer characteristics of the vibration control system.

The adaptive control algorithm used by the first and second adaptive digital filters 30, 32 may be obtained by the least square method (LSM=least-mean-square), recursion method, Newton's method, or other suitable method. Generally, the least square method is preferably employed.

The input signals "$X_1$" and "$X_2$" should be applied from the first and second vibration sensors 16, 20 to the first and second adaptive digital filters 30, 32, respectively, at the same time as the input signal "Z" is applied from the third sensor 22 to the filters 30, 32. Therefore, input circuits for the adaptive digital filters 30, 32 may incorporate, as needed, delay circuits which include delay elements, digital filtering elements or the like. Since the control device 24 operates in a feedback fashion, the device 24 may further include an oscillation preventing circuit that uses digital filtering elements or the like, as needed.

As described above, the input signal "$X_1$" from the first vibration sensor 16 and the input signal "$X_2$" from the second vibration sensor 20 are separately processed by the first and second digital filters 26, 28, respectively. Thereafter, the control signal "Y" for controlling the oscillating device 14 is obtained as a sum of the output signal "$Y_1$" of the first digital filter 26 and the output signal "$Y_2$" of the second digital filter 28. This independent processing of the input signals "$X_1$" and "$X_2$" from the first and second sensors 16, 20 can avoid any offset or cancellation of needed signal components which would occur where the mere sum of the input signals "$X_1$", "$X_2$" directly received from the sensors 16, 20 is processed as a reference signal.

In the present support apparatus provided with the adaptive control device 24 as described above, the operation of the oscillating device 14 is controlled on the basis of the signals from the first and second vibration sensors 16, 20 as reference signals and the signal from the third sensor 22 as an error signal, so as to minimize an error as represented by the error signal, that is, the vibrations at the monitoring point of the vehicle body 12. Thus, the oscillating device 14 operates to cause oscillation between the power unit 10 and the vehicle body 12, so that the oscillation interferes with the vibration of the power unit 10, to thereby reduce the vibration of the vehicle body 12 to a minimum.

In the instant embodiment, the signal "$X_1$" representative of the vibration of the power unit as detected by the first vibration sensor 16 and the signal "$X_2$" representative of the displacement of the suspension member in response to movements of the wheels 18 are both used as the first and second reference signals. Accordingly, the present support apparatus can provide a high vibration damping effect with respect to high-frequency vibrations that cause booming noise, for example, based on the input signal "$X_1$" from the first sensor 16 and at the same time provide a high vibration isolating effect with respect to low-frequency vibrations that cause shakes, for example, based on the input signal "$X_2$" from the second sensor 20. Since the effective damping of the low-frequency vibrations such as shakes can only be achieved by reduction of the oscillation of the power unit 10 per se, it is difficult to control the damping effect as desired, based on only the first reference signal "$X_1$" corresponding to the vibration of the power unit 10 detected by the first sensor 16. However, the present support apparatus as described hitherto is able to stably provide an excellent damping effect for the low-frequency vibrations, owing to the use of the second reference signal "$X_2$" indicative of the vibration of the suspension member which has a close relationship with the low-frequency vibrations, such as shakes.

Further, in the instant embodiment, the input signal "$X_2$" from the second vibration sensor 20 and the input signal "$X_1$" from the first vibration sensor 16 are processed independently of each other, through respective processing routines. Therefore, the control device 24 can effectively retrieve both a signal component included in the input signal "$X_1$" from the first sensor 16 which is closely related to the high-frequency vibrations, and a signal component included in the input signal "$X_2$" from the second sensor 20, which is closely related to the low-frequency vibrations. Consequently, the present support apparatus can provide further improved vibration damping and isolating effects based on the thus obtained signal components.

While the present invention has been described in detail in its presently preferred embodiment, for illustrative purpose only, it is to be understood that the invention is by no means limited to the details of the illustrated embodiment, but may be otherwise embodied.

While the most basic model of the present invention has been described in the illustrated embodiment, the basic model may be modified to provide improvements as needed, depending upon required vibration damping and isolating characteristics of real cars. For example, a plurality of first sensors, second sensors and/or third sensors, and/or a plurality of oscillating devices may be used so as to improve the accuracy for controlling the vibration damping/isolating function of the apparatus.

Further, since the power unit is considered as a rigid structure having a maximum of six types of free movements (longitudinal, transverse, vertical, rolling, pitching and yawing movements), two or more sensors capable of detecting vibrations in different directions and two or more oscillating means having different oscillating directions may be used in a suitable combination so as to provide a multidimensional or multidirectional vibration control device.

Moreover, a plurality of oscillating devices may be employed which are adapted to take different oscillating actions. For example, rolling and other vibrations may be effectively dealt with by performing relative control of a pair of oscillating devices which are disposed on the opposite sides of the rolling axis.

In the illustrated embodiment, the input signal "$X_1$" from the first vibration sensor 16 and the input signal "$X_2$" from the second vibration sensor 20 are independently processed by the first digital filter 26 and the second digital filter 28, respectively. However, the input signals from the first and second sensors 16, 20 may be processed by one digital filter, after the signals are summed up.

It is also to be understood that the present invention may be embodied with various other changes, modifications and improvements, which may occur to those skilled in the art, without departing from the scope and spirit of the present invention.

What is claimed is:

1. A vibration damping support apparatus for a power unit of an automobile, the power unit including an engine and being flexibly supported on a vehicle body of the automobile via a plurality of elastic mounts, comprising:

oscillating means disposed between the vehicle body and the power unit, for oscillating the power unit with respect to the vehicle body;

a first sensor attached to the power unit, for detecting vibration of the power unit;

a second sensor attached to a suspension member of a suspension system of the automobile, for detecting vibration of the suspension member, said suspension member being displaced relative to the vehicle body in response to movements of wheels of the automobile;

a third sensor attached to a monitoring point on the vehicle body, for detecting vibration of the vehicle body at the monitoring point; and control means for controlling said oscillating means, based on a first reference signal and a second reference signal received from said first sensor and said second sensor, respectively, and an error signal received from said third sensor, said control means performing an adaptive control for controlling an operation of the oscillating means, so that said error signal is minimized.

2. A vibration damping-support apparatus according to claim 1, wherein said oscillating means generates an oscillating force whose amplitude and frequency are variable.

3. A vibration damping support apparatus according to claim 1, wherein said oscillating means comprises a selected one of an electromagnetic actuator, piezoelectric actuator, an ultrasonic motor, a pneumatically operated system and a hydraulically operated system.

4. A vibration damping support apparatus according to claim 1, wherein each of said first sensor, said second sensor and said third sensor comprises a selected one of an acceleration sensor, a displacement sensor, a speed sensor, a load sensor and a microphone.

5. A vibration damping support apparatus according to claim 1, wherein said control means comprises a a first digital filter for converting a first input signal from said first sensor into a first output signal, a second digital filter for converting a second input signal from said second sensor into a second output signal, and a first and a second adaptive digital filter for updating respective filter factors of the first and second digital filters on the basis of said error signal, said oscillating means being controlled by a control signal obtained as a sum of said first output signal and said second output signal.

6. A vibration damping support apparatus according to claim 5, wherein said first adaptive digital filter receives said first input signal from the first sensor and said error signal from said third sensor while said second adaptive digital filter receives said second input signal from the second sensor and said error signal from the third sensor, the first and second adaptive digital filters processing said first, second and error signals according to an adaptive control algorithm so that said error signal is minimized.

* * * * *